Nov. 27, 1923

A. F. CASE 1,475,684

MATERIAL HANDLING APPARATUS

Filed April 12, 1920    10 Sheets-Sheet 5

Fig. 5.

Inventor
Arthur F. Case
by Thurston Kwis & Hudson
Attys

Nov. 27, 1923. 1,475,684
A. F. CASE
MATERIAL HANDLING APPARATUS
Filed April 12, 1920 10 Sheets-Sheet 7

Inventor
Arthur F. Case
by Thurston Kwis & Hudson
Attys.

Nov. 27, 1923

A. F. CASE

1,475,684

MATERIAL HANDLING APPARATUS

Filed April 12, 1920    10 Sheets-Sheet 8

Inventor:
Arthur F. Case
by Thurston Kwis & Hudson
Attys.

Nov. 27, 1923

A. F. CASE

MATERIAL HANDLING APPARATUS

Filed April 12, 1920     10 Sheets-Sheet 10

Inventor
Arthur F. Case
by Thurston Kwis & Hudson
Attys.

Patented Nov. 27, 1923.

1,475,684

UNITED STATES PATENT OFFICE.

ARTHUR F. CASE, OF CLEVELAND, OHIO, ASSIGNOR TO THE WELLMAN-SEAVER-MORGAN COMPANY, OF CLEVELAND, OHIO, A CORPORATION OF OHIO.

MATERIAL-HANDLING APPARATUS.

Application filed April 12, 1920. Serial No. 373,130.

*To all whom it may concern:*

Be it known that I, ARTHUR F. CASE, a citizen of the United States, residing at Cleveland, in the county of Cuyahoga and State of Ohio, have invented a certain new and useful Improvement in Material-Handling Apparatus, of which the following is a full, clear, and exact description.

This invention relates to an apparatus for handling material such as coal, adapted to receive loaded cars and to dump the contents thereof into boats or other receiving apparatus, and is adapted particularly for installation on piers alongside of which one or more boats are adapted to be brought to be loaded.

The principal object of the invention is to provide an apparatus of this character which is more efficient than the car dumpers and boat loading apparatus heretofore used, and more economical than the latter, first, in operation, particularly in regard to the amount of labor or number of men required to operate the apparatus and to control the loaded and empty cars, and, second, in the respect that it effects a great saving in space by the elimination of long and expensive approaches and run-off grades, which heretofore have been required with the customary boat loading dumpers.

Further, the invention aims to provide a multiple unit car handling and dumping apparatus with separate units for receiving, dumping, and removing the cars, so arranged and constructed that the performance of one of the three functions is not delayed by any of the other two, thus permitting the cars to be handled at a very rapid rate.

The invention aims also to provide an apparatus having the advantages above enumerated, and a further important advantage, that it is capable of discharging the coal or other material into boats at both sides of the pier, thus making it possible to either load two boats simultaneously or successively without requiring that the apparatus be held idle while a loaded boat is being removed and a second boat to be loaded is brought into position for loading, and to accomplish this with a single dumper having a single runway instead of separate and independently operating car dumpers, one for each side of the pier, and provided with two runways, inclined approaches, and run-off grades which two car dumpers would require.

The above, and numerous other more specific objects which will appear in the following description are attained by the present invention, which may be briefly summarized as consisting in certain novel combinations and arrangements of parts and details of construction which will be described in the specification and set forth in the appended claims.

In the accompanying sheets of drawings which show one embodiment of the invention, Fig. 8ᵃ is a side view of one of the car clamps; Fig. 8ᵇ is a top plan view of a part of the same; Figs. 9 to 13 are somewhat diagrammatic cross-sectional views of the rolling cradle of the dumping unit, Figs. 9 and 10 showing particularly mechanism utilized for lifting car clamps with which the cradle is provided, as the cradle is being restored to normal position; Fig. 11 showing how the car clamps are pulled down against the top of the car to hold the car onto the platen of the cradle when the cradle of the loaded car is being rolled in either direction from mid or normal position; and Figs. 12 and 13 showing mechanism with which the cradle is provided for shifting laterally the platen of the cradle when the cradle is being rolled either from or to mid position so that the platen and car will be gradually shifted away from normal position until the side of the car rests against the car blocking on the side of the cradle as the cradle starts to roll from mid position, and so that the platen and the empty car will be gradually brought to normal position at the center of the cradle when the cradle is being rolled back to its mid position after the dumping operation.

Referring now to the drawings, 10 represents a pier on which the apparatus constituting the subject matter of this invention is preferably, although not necessarily installed, and alongside the pier are shown two boats 11, into the hatches 11ᵃ of which the material hereinafter for convenience termed coal, is loaded, the boats being on opposite sides of the pier as shown. In the respect that the coal handling apparatus constituting the subject matter of this invention is capable of loading a boat on either side of the pier, or the two boats on both sides, it may be aptly termed a duplex loading machine.

Figure 1:
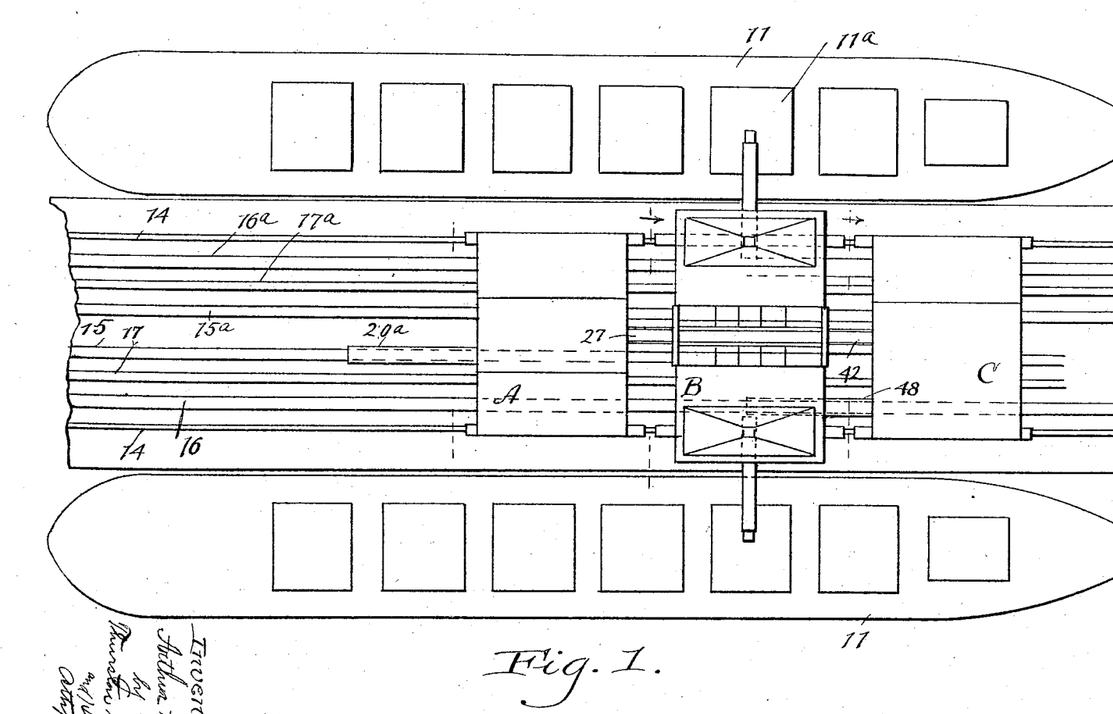
Fig. 1 is a top plan view of the apparatus on a pier, and in position for loading two boats arranged on opposite sides thereof, the parts being shown for the most part, conventionally.
Figure 2:
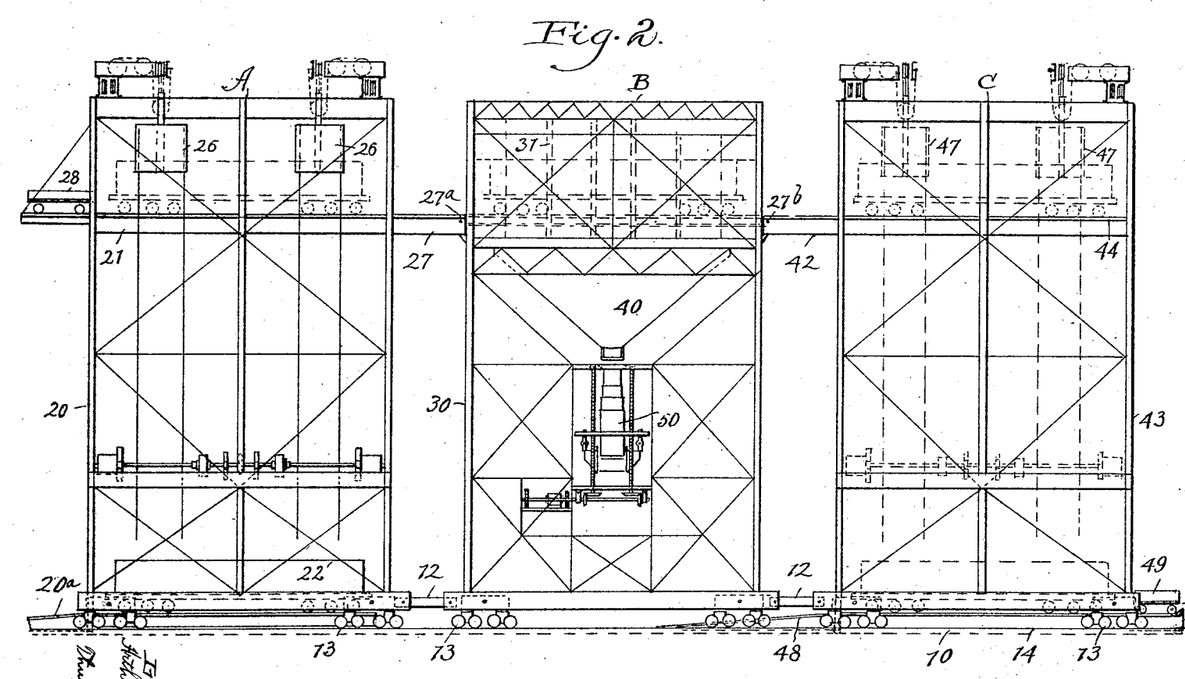
Fig. 2 is a side view of the three units of which the invention is composed, the unit at the left being what may be termed the car elevator, the middle unit being the car dumper and boat loading unit, and the unit at the right being what may be termed the lowerator, the function of which is to lower the emptied cars and to shift them onto the track by which they are removed from the pier.

The duplex loading machine preferably consists of three units, which for convenience will be described as the elevator A, the dumper B, and the lowerator C, which are preferably linked together by suitable coupling means 12, shown in Fig. 2, so that all three units may be simultaneously moved lengthwise of the pier. The three units of the machine are mounted on trucks 13 which travel along the same runway, composed of suitable tracks 14, which are arranged near the opposite sides of the pier, and preferably extend the full length of the same. These trucks will preferably be provided with driving means so that the machine as a whole can be moved along the runway and properly positioned to discharge coal or the like into the boats, it being intended that the machine be moved as the loading progresses, so that the loading and distributing elements of the dumper unit B will be moved from hatch to hatch as required to properly distribute material in the boats.

To handle the loaded and empty cars conveyed to and from the multiple unit duplex loading machine, two service tracks are required, one a track 15, for the loaded cars, and a second track 16 for the empty cars. Additionally, I prefer to employ a third track 17 which is to be occupied by a pusher or haulage car which is shown at 18, and which can be electrically operated, if desired, the track for the car 18 being preferably located between the tracks 15 and 16, and the primary function of the car 18 being to push the loaded cars up onto the elevating platform of the elevator A, though if desired, this same car may be utilized to shift the empty cars along the track 16.

The three tracks, 15, 16 and 17 for the machine shown in the drawings, are located at the right hand side of the center line of the pier, but as it may be desired to employ two of the multiple unit duplex machines on the same pier and movable along the same runway tracks 14, I have shown at the left hand side of the pier a duplicate set of tracks 15ᵃ, 16ᵃ and 17ᵃ for accommodating a similar multiple unit duplex machine located further out along the pier. By reference to Figs. 3, 4 and 5 it will be seen that the three units A, B and C are in the form of portals which permit the passage of cars on the tracks 15ᵃ and 16ᵃ to the further or second multiple unit machine so that each machine can be served without in the least interfering with the operation of the other.

Figure 3:
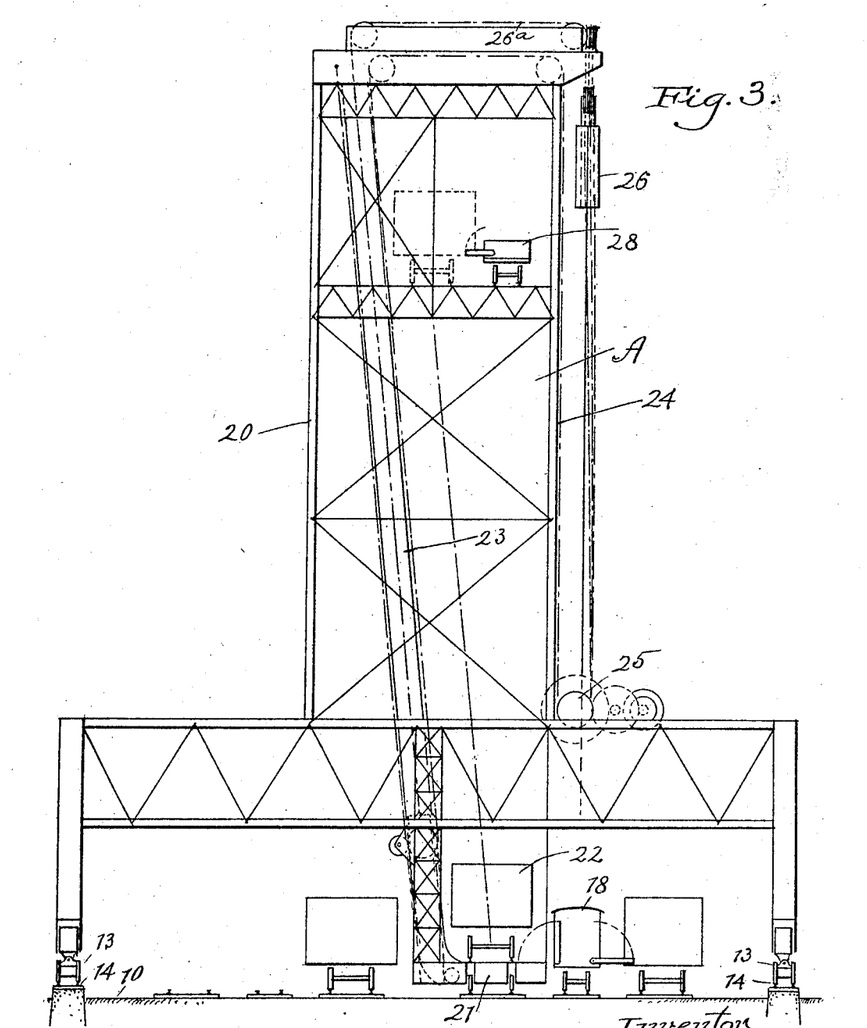
Fig. 3 is an end view of the elevator showing tracks not only for the apparatus of which the elevator is a part, but of a duplicate set of tracks for the second apparatus which can be located further along the pier should the use of such second apparatus be desired.

Considering next the structure and function of the three units A, B and C. It is apparent from what has preceded, that the function of the elevator A is to raise the loaded cars from the pier level to the necessary height for discharging the contents of the cars into the boats. For this purpose the unit A, or elevator, is provided with a supporting structure 20, and a movable platform 21 having rails on which loaded cars, indicated at 22, are adapted to be run. This platform moves up and down along guideways 23, which are slightly inclined, as indicated in Fig. 3, and may be operated by any suitable mechanism located in the structure of the machine, but preferably by properly arranged cables 24, leading from the motor driven winding drums 25 over sheaves at the top of the supporting structure 20 to the platform. Counterweights 26 are also provided for the purpose of reducing the power required to hoist the dead weight of the platform, these counterweights being movable up and down along one side of the structure 20 and being supported by cables 26ª which pass about upper stationary sheaves and from the latter extend down to and are attached to the platform.

Connected to, and traveling with the elevator is an inclined approach 20ª, (see particularly Fig. 2) having rail points which register with the rails of the loaded car track 15 on the pier. When the platform 21 is in lowered position, the rails of the platform register with the rails of the approach 20ª so that a loaded car can be pushed up the approach by the haulage car 18 which travels along the track 17 as already described.

The loaded car having been placed on the elevating platform, the latter is raised to the upper position of its travel, at which point the car rails of the platform are in register with, or in alignment with the rails of a run-off girder 27 which extends from the elevating unit to the dumping unit and over which the car passes to the dumper. For the purpose of shifting the loaded car from the platform of the elevator across the run-off girder 27 into the cradle of the dumper, the upper part of the elevator structure 20 is provided with a pusher or haulage car 28 (see Figs. 2 and 3), which may be electrically operated, and travels along a track which is at the side of the rails of the lifting platform 21 when it is in elevated position, this being indicated in Fig. 3.

Figure 4:
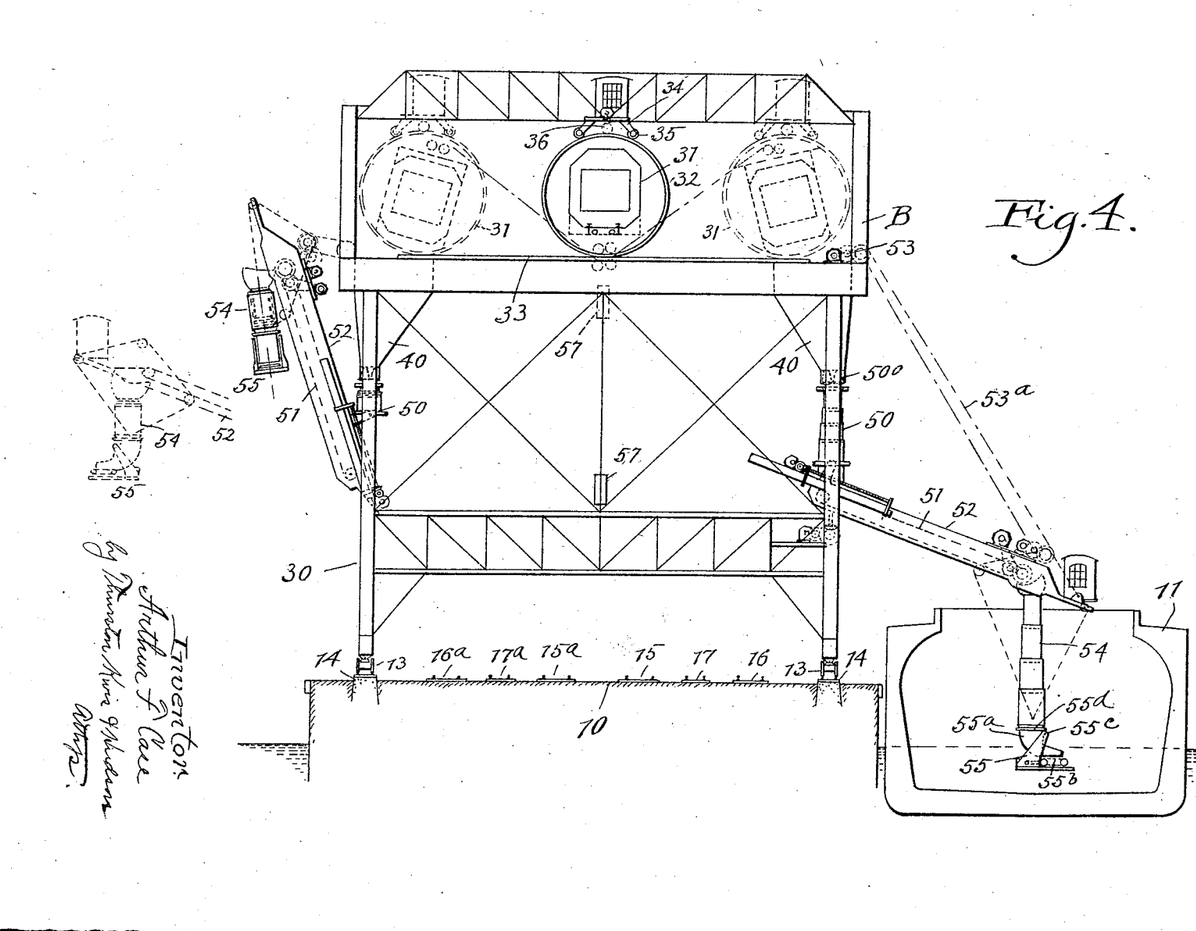
Fig. 4 is a similar view of the car dumping and boat loading unit, showing the material receiving and distributing part of the apparatus at the right hand side in position for loading a boat, while a similar apparatus at the left hand side of the unit is elevated, as when not in use.
Figure 5:
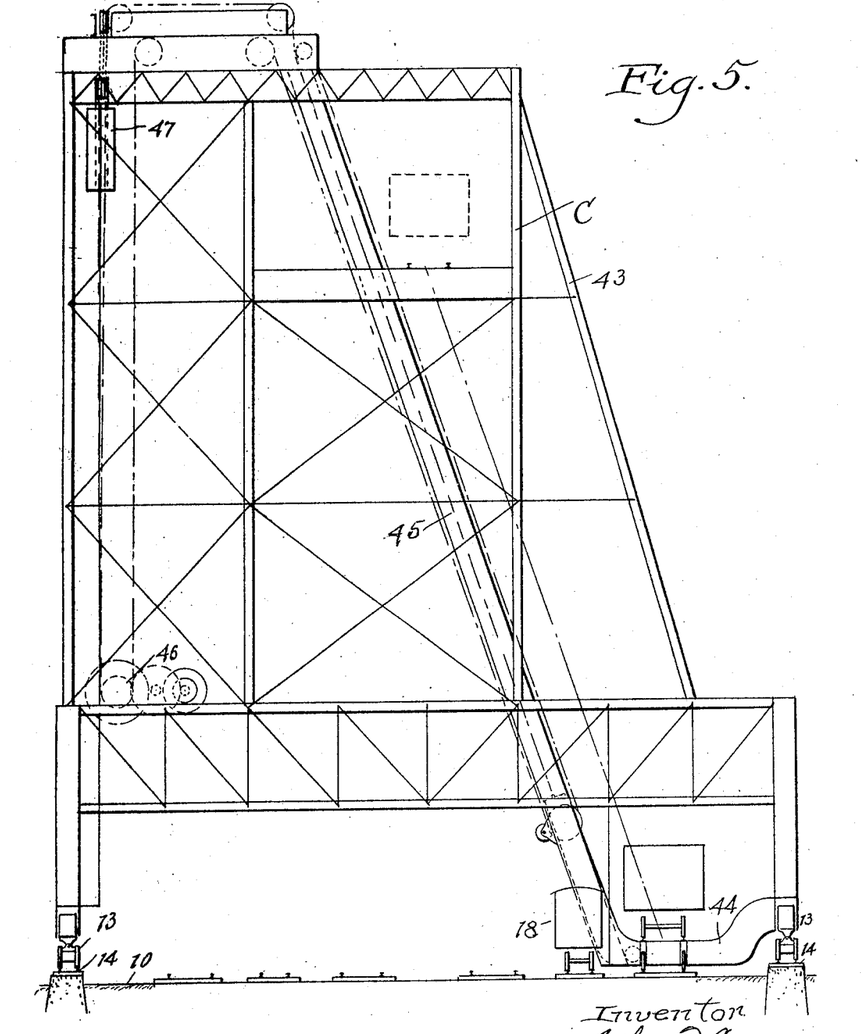
Fig. 5 is a similar view of the lowerator.

Considering next the dumping unit B, this unit includes a supporting structure 30 at the upper part of which is a car receiving cradle 31, when in its normal upright and car receiving position is at the center of the structure (as shown in Fig. 4) in line with the run-off girder 27, over which the car is pushed from the platform of the elevator, as just described.

Figure 6:
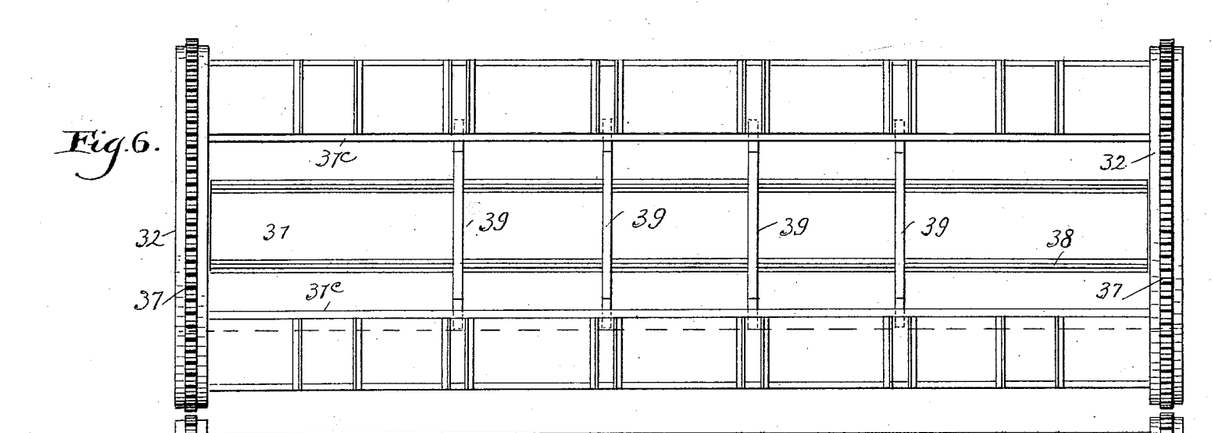
Figs. 6, 7 and 8 are respectively a top view, a side view, and an end view of a rolling car dumper, which is preferably employed, and which is capable of rolling in either direction from car receiving position so as to dump the contents on either side of its central position.
Figure 7:
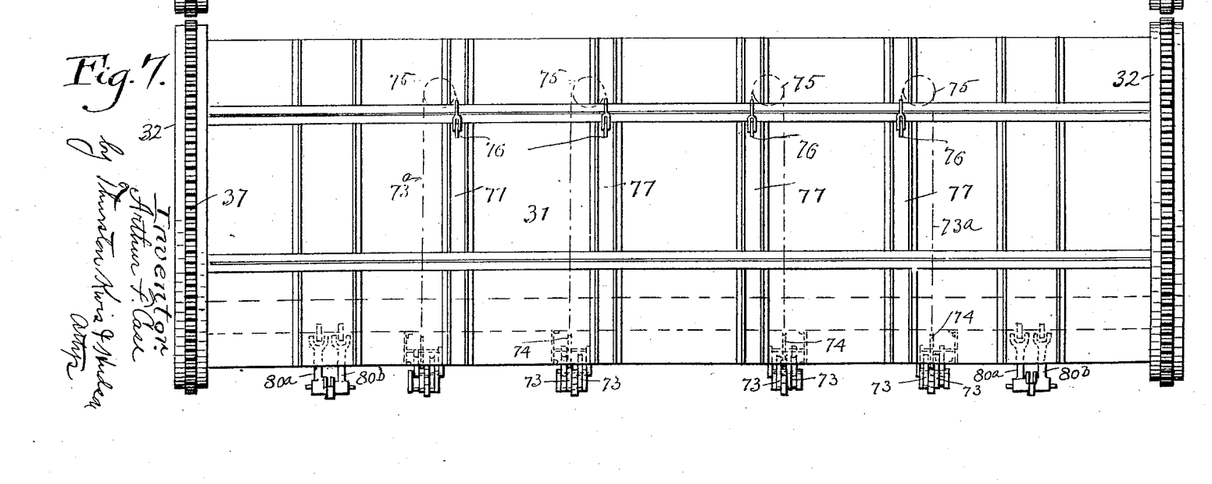
Figure 8:
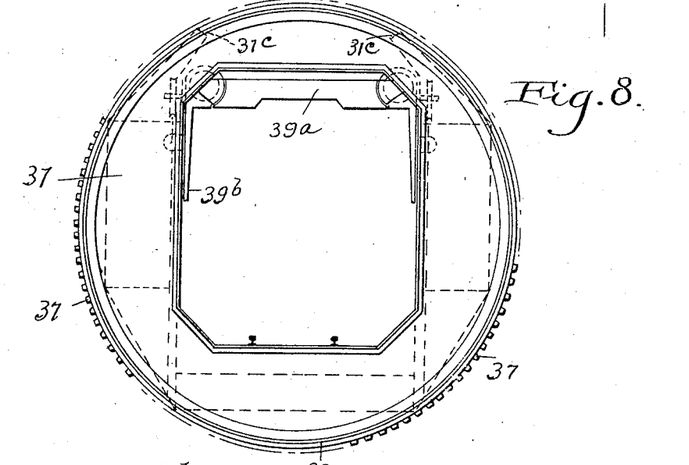

Preferably the cradle which is shown in Figs. 6, 7 and 8, and also diagrammatically in other figures, is of the rolling type, and a horizontal runway is provided so that the cradle may be rolled in either direction from car receiving position.

Preferably the form and shifting mechanism of the cradle are substantially as illustrated and claimed in my prior application, Serial No. 317,711, filed August 15, 1919, and as the details of construction of the cradle are not claimed herein, its structure will be referred to only briefly. This cradle consists of a steel structure, substantially U-shaped in cross section, having parallel sides 31ª, and a base 31ᵇ, while at the top or opposite to the base there is an open slot or mouth 31ᶜ extending the length of the cradle through which the material is discharged when the cradle and car are rolled over by rolling the cradle in either direction. The ends of the cradle structure are surrounded by rings 32 which roll on horizontal tracks 33, (see Fig. 4). Preferably power is applied to roll the cradle in either direction in the manner and by the means described in detail in my prior application, and which briefly stated comprises an upper traveling frame 34, which is supported on top of the cradle and has rollers 35 engaging its ends, and having power driven pinions 36 which engage gears 37, which also surround the ends of the cradle structure alongside the rings 32 of which the gears 37 may be a part. As described in my prior application, the pinions 36 engage upper horizontal racks extending crosswise of the runway at the same time that they engage the gears 37 surrounding the cradle, and the gears 37 also engage lower horizontal racks along the tracks 33. Thus by this mechanism the cradle can be rolled from mid position to dumping position in either direction so as to dump the contents of the car into the receiving means shortly to be referred to, and may then be rolled back again to mid or car receiving position.

The car rails of the cradle are attached to a platen 38 supported in the cradle structure on rollers which permit sidewise movement of the platen which is necessary in order that the side of the car may be supported as it and the cradle are rotated to discharge the contents of the car. The movement of this platen is governed by shifting levers which will be described later. It may be mentioned at this point also, that as the cradle rolls over, the car is held down onto the rails of the platen by car clamps 39 which are adapted to engage the top of the car, and which are raised and lowered in a manner to be subsequently described.

As the cradle is rolled, the car is rotated and carried laterally, and its contents is discharged into either one of two receiving bins 40, depending on the direction in which the cradle is rolled, which bins are located in proper position at opposite sides of the supporting structure 30 of the dumping unit. During this rotation, the platen is shifted sidewise in the direction of rotation until the side of the car rests against blocking 41 on the adjacent side of the cradle, after which the car clamps automatically set and hold the car securely in place until the contents is discharged and the cradle has been rolled back with the empty car. As the cradle is restored to its normal position, the clamps release, and the platen automatically returns to its central position, as will be subsequently explained.

Next the empty car is pushed out of the cradle of the dumper over a run-off girder 42 onto the platform of the lowerator or lowering unit C, this girder 42 connecting or extending between the upper portions of the dumping and lowering units the same as the run-off girder 27 extends between the elevating and dumping units, and having rails which align with the rails of the platen of the cradle and platform of the lowerator when the cradle is in normal position and the platform of the lowerator is in its elevated position ready to receive an empty car.

The lowering unit includes a supporting structure 43, and a platform 44 on which the empty car is adapted to be run. This platform travels up and down along guides 45 which are somewhat more inclined than the guides 23 for the platform of the elevator, since the cars from the platform 44 are deposited on the empty track 16 which is laterally outside of the loaded track 15. The platform 44 is moved up and down by mechanism 46 which may be the same as the mechanism of the elevating unit, this mechanism including suitable cables passing around properly positioned sheaves and connected to the platform, and as with the case of the platform of the elevator, the platform 44 has connected to it counterweights 47.

The lower part of the frame of the lowering unit has a discharge incline 48, (see particularly Fig. 2) which incline has rails which register with the rails of the empty track 16, and with the rails of the lowering platform when the latter is in its lowermost position. The cars are pushed off the platform of the lowering unit down the incline 48 by a small pusher car 49, (see Fig. 2) which like the pusher or haulage cars previously referred to, may be electrically operated, and preferably travels over the car rails of the platform 44, or if desired, along special car rails.

I will next revert to the dumping unit and describe certain detail features briefly, as the specific details of these features are not per se claimed in this application.

Considering first the mechanism here shown for transferring the material from the bins 40 to the hatches of the boats 11, it will be observed by reference particularly to Fig. 4, that material is conveyed from each bin by vertical chutes 50, the delivery of the material into the chutes being preferably controlled by gates indicated at 50ª at the bottom of the bins. These chutes may be, and preferably are composed of telescopic sections, as indicated in Fig. 4, so that the effective length of the chute can be varied as desired, and so as to permit the laterally extending part of the loading apparatus to be swung to inoperative position shown at the left hand side of Fig. 4, whereas at the right hand side of Fig. 4 the chute 50 is shown extended with the entire loading apparatus including the parts to be referred to presently in position for distributing material into a hatch of one of the boats.

From the chute 50 the material is discharged onto a conveyor shown by dotted lines at 51, supported in a boom 52. The boom is pivoted at its inner end so that it can be swung up and down by hoisting mechanism 53 and cables 53ª connected to the outer end of the boom, and the reach of the boom is preferably adjustable so that material can be properly discharged into boats of varying widths, while the inner end of the boom is adjustable as to height to accommodate different heights of boats. This arrangement permits of proper adjustment of the outer end of the boom to suit working conditions and also permits the boom and the parts supported by it to be raised to out-of-service position so that it will clear the rigging of boats. The boom conveyor 51 delivers material to a telescopic chute 54 suspended from the outer end of the boom. Suitable means will be provided for extending or collapsing the chute 54 as well as for swinging it in a vertical plane in order that the distance of its lower end from the face of the pier may be varied.

The lower end of the telescopic chute 54 is provided with a trimmer 55, for distributing the material in the hold of the boat. One portion of the trimmer forms an elbow 55ª which changes the direction of the descending material, deflecting the discharge to an approximately horizontal direction onto a conveyor belt 55ᵇ forming a part of the trimmer. This conveyor will be operated at a comparatively high speed and acts to accelerate the velocity of the material so that it is projected to a considerable distance from the chute. The trimmer belt and its driving means are mounted on a hinged frame, pivoted at 55ᶜ to the elbow section in such a manner that it can be retracted to a position which allows the material to discharge directly into the boat without passing from the belt 55ᵇ, and the entire trimming device is suspended from the lower end of the chute 54 by a swivel bearing 55ᵈ so that it may be rotated on the axis of the chute so as to discharge the material in any direction.

Though I have shown only one form of apparatus for delivering material from the bins to the boats and for distributing the material in the hatches, I wish it to be understood that any other suitable mechanism for this purpose may be employed.

Figure 8A:
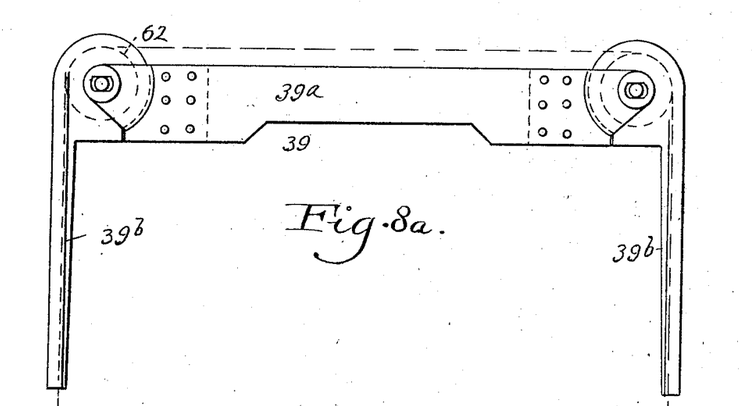
Figure 8B:
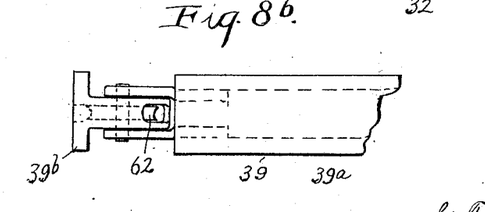

Reverting next to the car clamps 39, a series of these clamps are employed, four being shown in Fig. 6, each preferably having the construction shown in Figs. 8ª and 8ᵇ. As shown in these figures, each clamp is composed of a cross bar 39ª which is adapted to rest on the top of the car which is to be held onto the platen of the cradle, and at the ends of the bar, castings 39ᵇ, which are designed to slide up and down in guide-ways on the inner sides 31ª of the cradle.

When the cradle is in normal upright position, the clamps are elevated and are held in elevated position by mechanism next to be referred to, but when the car is rolled from normal position in either direction, the clamps are pulled down onto the top of the car in the cradle, and exert sufficient pressure on the car to hold it in place during the dumping operation, by means of a series of counterweights 57, (see Figs. 4 and 11) one counterweight being provided for each car clamp. These counterweights move up and down on the center plane of the dumping unit as shown in Fig. 4, or in a plane directly beneath the center line of the cradle when in its central car receiving position. The ends of a two-part cable 58 are attached to the counterweight and pass upwardly therefrom between two sheaves 59 (see particularly Fig. 11) located in the stationary part of the car dumper frame and between two similar sheaves 60, carried in the lower part of the rolling cradle. From these sheaves 60 the two parts of the cable pass in opposite directions to and around deflecting sheaves 61 also carried by the lower part of the cradle near the parallel sides 31ª thereof. Then the two parts of the cable pass upwardly along the inner sides of the side walls 31ª of the cradle through the castings 39ᵇ of the clamp and around sheaves 62 located in the upper portions of the castings, concentric with the connections of the cross member 39ª of the clamp with the castings 39ᵇ, and then across the top of the cross member 39ª of the clamp, as clearly shown in Fig. 11. Thus each cable forms a loop which extends around the clamp and around the car when it is on the platen of the cradle, down to the counterweight.

Figures 14, 15, 16:
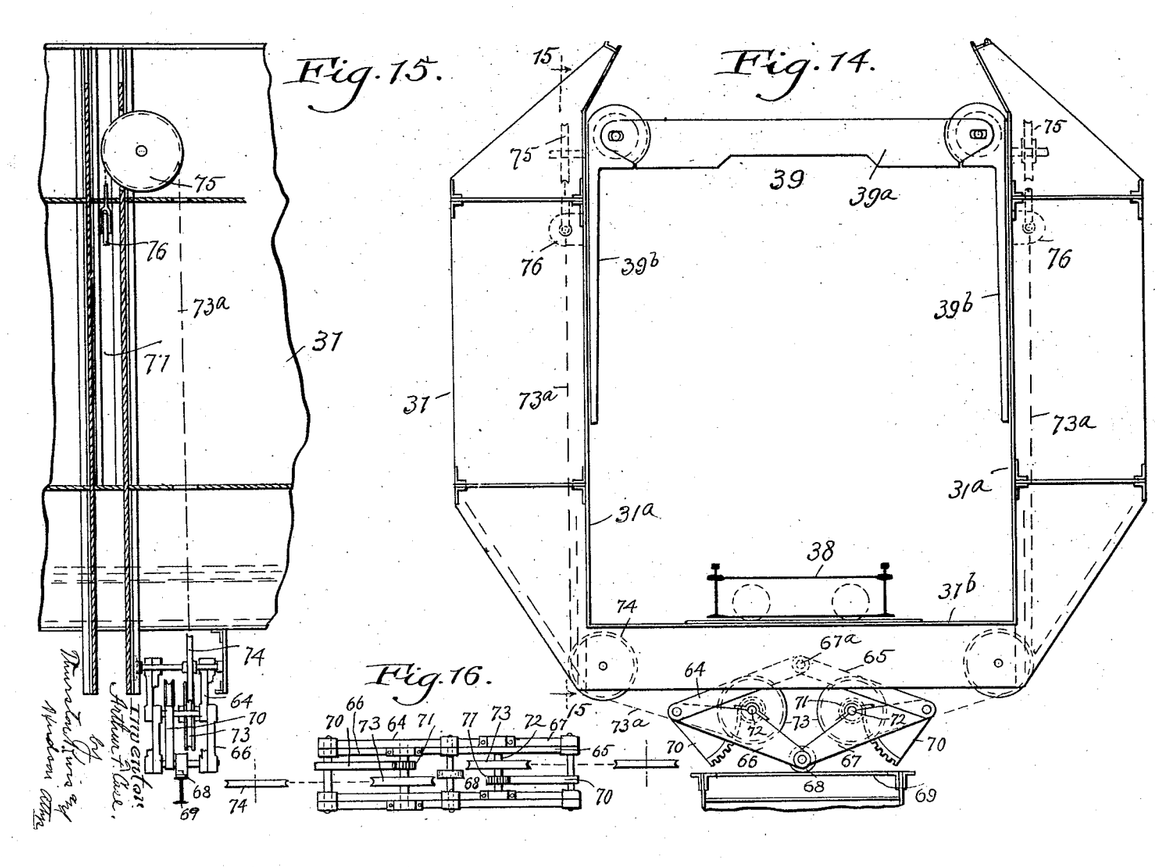
Fig. 14 is an enlarged cross sectional view through the cradle, showing particularly the car clamp elevating mechanism.
Fig. 15 is a cross sectional view substantially along the line 15—15 of Fig. 14, looking in the direction indicated by the arrows.
Fig. 16 is a top plan view of the car clamp elevating mechanism shown in Figs. 14 and 15.

The clamps are normally held up out of engagement with the car (when the cradle is in normal position) by means of clamp lifting devices, each associated with one of the clamps, which devices operate automatically as the cradle is revolved to its initial or normal position, these lifting devices serving not only to lift the clamps when the cradle is restored to normal position, but automatically permitting the clamps to descend when the cradle is revolved from normal position. Each clamp lifting device or mechanism is located at the bottom of the cradle, below its associated clamp, and each includes a set of arms 64, 65, 66 and 67 arranged in the form of a pantograph supported and pivoted at 67ª at the bottom of the cradle structure and on the center line thereof. Each pantograph is flattened as the cradle is being restored to normal position, and is widened or permitted to open through the medium of a roller 68 at the junction of the lower arms 66 and 67 of the pantograph, and engaging a horizontal track or platform 69. The opening and closing of the pantograph shifts a pair of gear segments 70 supported on shafts connecting the arms 64 and 66, and 65 and 67, which segments are fixed with respect to and are given a rotative movement with the upper arms 64 and 65 as the pantograph is opened or closed, and this movement causes the rotation of two pinions 71, which are engaged by the segments 70, which pinions are on short shafts 72 carried by the lower arms 66 and 67 of the pantograph, and provided with cable drums 73. Attached to these drums are cables 73ª which extend in opposite directions around sheaves 74 at the bottom of the cradle structure, and then upwardly along the outer sides of the side walls 31ª of the cradle around sheaves 75 near the top thereof, (see Fig. 15) then part way around these sheaves, and down to lugs 76 extending outwardly from the car clamp castings 39ᵇ, which lugs move up and down through slots 77 in the side walls 31ª of the cradle.

Figure 9:
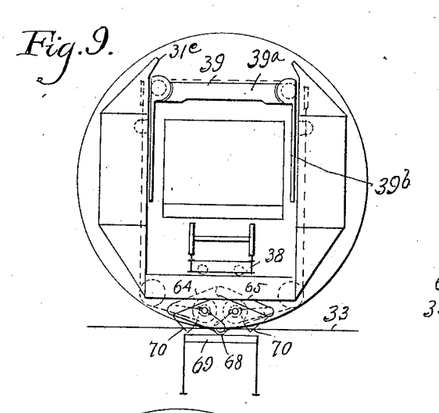
Figure 10:
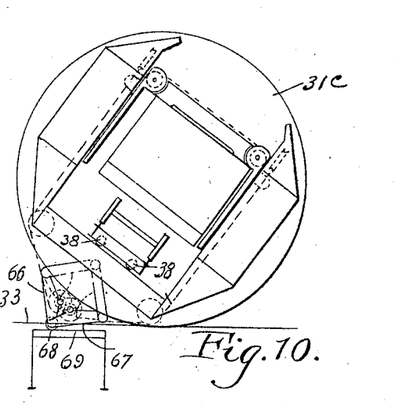

The operation of the clamp lifting mechanism is as follows: When the cradle is in normal or car receiving position, the parts are in the position shown in Figs. 9 and 14, and as the cradle rolls to the right or left, the roller 68 continues for a time to engage the track or platform 69, and the pantograph is permitted to open in the manner indicated in Fig. 10. It is moved toward open position by the action of the counterweight 57 which at all times exerts a downward pull on the clamp and an upward pull on the cables 73ª. As it is thus being opened, and the clamp is being lowered, the drums 73 are rotated, paying out the cables 73ª, and this allows the clamp to gradually descend under the action of the counterweight.

As the cradle is restored to normal position, the roller 68 engages the track or platform 69, and gradually as the cradle is moving to its normal position the pantograph is flattened by the action of the roller 68 on the track or platform 69, and this causes the rotation of the drums 73 which wind in the cable 73ª and positively elevates the clamp from the car. This same action takes place simultaneously with all the clamps, each of which is provided with its own counterweight, and with its own clamp lifting mechanism as already explained.

The next and last feature of the mechanism of the dumper unit B which I desire to explain, is the mechanism for shifting and controlling the lateral movement of the platen as the cradle is being moved from and back to normal position. It was previously stated that at the start of the turning movement from normal position, the platen and the loaded car on it are moved laterally in the direction of rotation until the car rests against the blocking on the adjacent side of the cradle, and that as the cradle is restored to normal position, the platen and the empty car are moved laterally to normal central position in the cradle so that another car can be pushed from the platform of the elevator onto the cradle, and the empty car pushed from the cradle onto the platform of the lowerator. I provide at the lower side of and near each end of the cradle, platen shifting mechanism shown in Figs. 7, 17, 18 and 19, and diagrammatically in Figs. 12 and 13, these mechanisms being similar to each other and symmetrically disposed with reference to the longitudinal center of the cradle. Each mechanism consists of two units adjacent to each other and operative in opposite directions. For convenience, parts composing one unit are designated by reference characters with the index $a$, and the similar parts of the other unit by similar reference characters with the index $b$. Each shifting mechanism includes two arms $80^a$ and $80^b$ rotatably supported on a shaft 81 at the bottom of the cradle structure a distance below the platen. These arms extend upwardly from the shaft in nearly a vertical direction, but slightly inclined with reference to each other, and at their upper ends they are forked. The upper forked end of arm $80^a$ is connected by a pair of links $82^a$ to a sliding member $83^a$ positioned on a guide rod $84^a$ supported on the lower side of the cradle structure. Similarly the arm $80^b$ of the other unit is connected to a sliding member $83^b$ on a second guide rod $84^b$ (see Fig. 18) secured to the platen. Extending downwardly through slots in the bottom of the cradle structure are two abutments $85^a$ and $85^b$ which are faced in opposite directions with respect to each other, and which extend down from points directly above the two guide rods $84^a$ and $84^b$, one partly enveloping or straddling one rod, and the other partly enveloping the other rod. Between the sliding member $83^a$ and the abutment $85^a$, is a coil spring $86^a$, and likewise between the sliding member $83^b$ and its abutment is a similar spring $86^b$. It will be seen, therefore, that if the arm $80^a$ as viewed in Fig. 17 is turned to the left, the spring $86^a$ will be compressed, and by its action on the abutment $85^a$ will move the platen toward the left, and that if the arm $80^b$ is moved toward the right it will compress the associated spring $86^b$ and by its action on the abutment $85^b$ will move the platen toward the right.

At the lower ends of the arms $80^a$ and $80^b$, and concentric with respect to their common supporting shaft 81 are two gear segments $87^a$ and $87^b$, these segments facing in opposite directions, and being fixed respectively to the two arms. These segments are engaged by segments $88^a$ and $88^b$ mounted on two shafts $89^a$ and $89^b$, located on opposite sides of the center shaft 81, and fixed to and adapted to turn with these segments are two substantially horizontal oppositely extending arms $90^a$ and $90^b$ provided at their free ends with rollers $91^a$ and $91^b$, which engage on a horizontal track or platform 92 tangent to the circular rings at the ends of the cradle.

Figures 11, 12, 13:
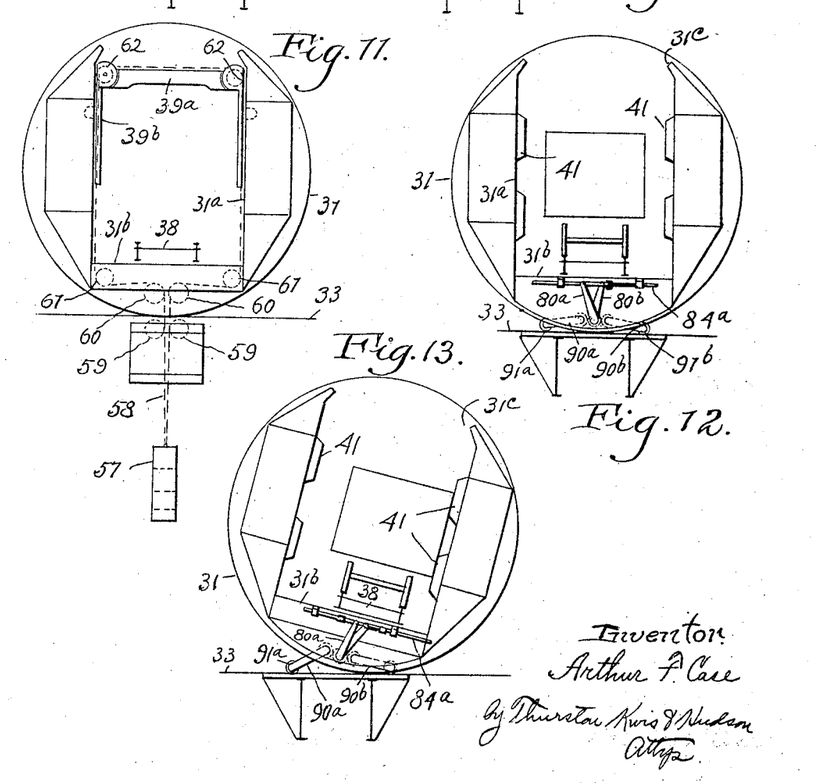
Figure 17:
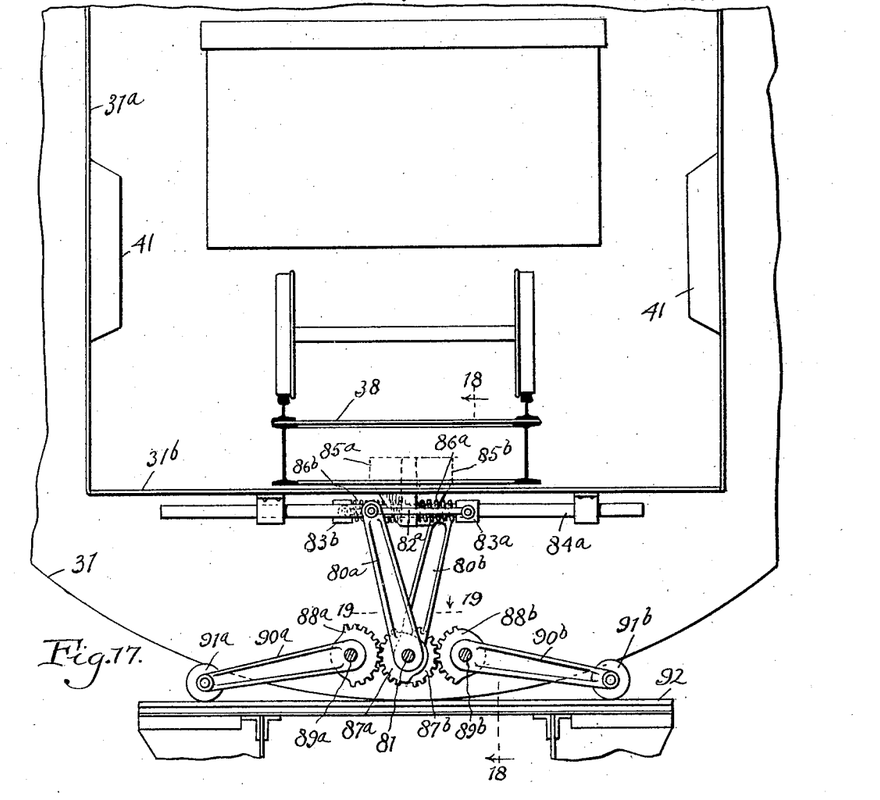
Fig. 17 is a view similar to Fig. 14, showing particularly the platen shifting mechanism.
Figures 18, 19:
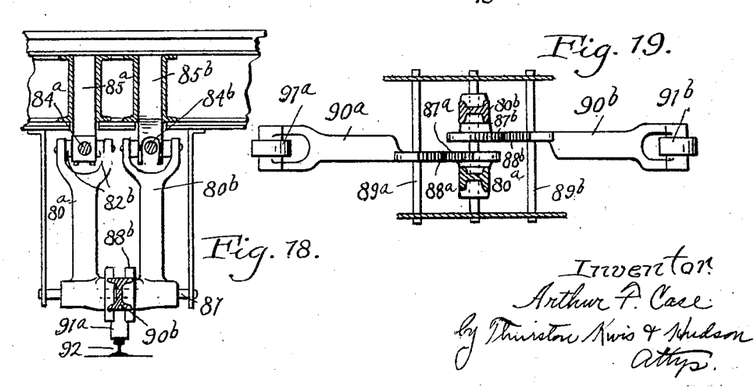
Fig. 18 is a sectional view substantially along the line 18—18, looking in the direction indicated by the arrows.
Fig. 19 is a horizontal sectional view substantially along the line 19—19 of Fig. 17, looking downward.

It will be seen therefore, particularly by reference to Figs. 13 and 17, that if the cradle is rolled to the right, by the action of the roller $91^b$ on the track or platform 92, the arm $90^b$ is in effect given a counter-clockwise movement relative to the cradle, which through the meshing gear segments $88^b$ and $87^b$ imparts a clockwise movement to the upright arm $80^b$, and the movement of this arm in the direction stated, is transmitted to the sliding member $83^b$ and associated spring $86^b$, and is exerted on the face of the abutment $85^b$ moving it to the right, causing the platen and the car on it to be moved in that direction. This movement of the platen, of course shifts the abutment $85^a$ to the right, and thus through the spring $86^a$, sliding member $83^a$ and links $82^a$ swings the arm $80^a$ to the right or in clockwise direction, and the effect of this is to rotate the arm $90^a$ in a counter-clockwise direction, but due to the fact that the roller $91^b$ is pressing on the track or platform $91^a$, this movement is permitted only at a rate dependent on the speed of rotation of the cradle, and hence at the same time that the unit composed of the parts designated by the reference numerals having the index $b$ shifts the platen toward the right, the other unit controls or checks the rate of movement of the platen so that it becomes impossible for gravity to cause a rapid movement of the platen and car toward the side of the cradle. Therefore, the movement is gradual until the car is brought up against the car blocking.

When the car is rolled in the opposite direction, the unit composed of the parts designated by reference characters with the index $a$, causes the platen and car to be shifted to the left until the car rests against the blocking on the left hand side of the cradle, while the parts composing the other unit control the rate of movement.

Likewise when the car is being restored to normal position, when the cradle reaches a point such that the rollers re-engage the track 92, the two shifting units at each end of the car serve to restore the platen and empty car to normal position at the center of the cradle, and this takes place gently or gradually, one unit at each end of the car moving the car and platen, and the other unit controlling its movement.

The operation of the platen shifting mechanism and of the car clamp shifting mechanism is such that when the cradle is being rolled from normal position with a loaded car, at and adjacent the start of the rolling movement the platen and car are gradually shifted laterally in the direction of rotation until the car rests against the blocking on the adjacent side of the cradle, and then the car clamps are lowered onto the top of the car and hold the car onto the platen while the car is being dumped and through the major portion of the return movement of the cradle and car. Just before the cradle reaches its normal position the clamps are automatically lifted from the top of the car, and then the platen and car are moved back to the normal central position which brings the rails of the platen into alignment with both run-off girders at opposite ends of the dumper structure.

As far as I am aware, I am the first to provide a rolling cradle with a movable car platen, together with mechanism by which as the car is rolled, the platen is gradually shifted to bring the car up against the side of the cradle whether the cradle is capable of being moved in one direction from normal position, or in both directions from normal position, and while the mechanism here shown may be employed to advantage, the specific mechanism by which the platen is shifted and controlled in its movement may be other than that here shown.

In concluding the description of the apparatus constituting the subject matter of this invention, it might be mentioned that the run-off girders 27 and 42 which respectively extend from the elevator to the dumping unit, and from the dumping unit to the lowerator are preferably pivoted respectively at 27ᵃ and 27ᵇ to suitable parts on the ends of the supporting structure of the dumper, so that when the platforms are lowered, these run-off girders will swing downward slightly, and when the platforms are elevated, they will engage the slightly lowered ends of the girders, and lift them to horizontal position. This will insure that the rails of the platforms of the elevator and lowerator will always be in direct alignment with the rails of the run-off girders when it is desired to transfer a car, whether a loaded car or an empty car from one unit to the other.

It is thought the operation of the machine will be understood from the foregoing description but by way of summary, it might be mentioned that both boats can be positioned along the pier before the loading starts, or the second boat can be positioned for loading while the loading of the first progresses, so that the operation of the machine will not be delayed as would be the case if the second boat to be loaded could not be brought to loading position until the removal of the loaded boat.

The loaded cars are transferred one at a time from the loaded track to the platform of the elevating unit, but as soon as a car is transferred from the elevator onto the cradle of the dumping unit, the platform of the elevator can descend for the next car, and when the dumping operation of one car is completed, the next loaded car can be in position to be immediately pushed onto the cradle of the dumper without any delay on account of the removal of the empty car, since the sole function of the lowering unit is to handle the empty cars and the platform of the lowering unit can be in position to receive the empty car as soon as the loading operation is completed. Thus with this mechanism the cars can be handled very rapidly and the transferring of material from the cars to the boats can be accomplished in a very efficient manner, and economically not only because the speed at which the cars can be handled but because less men are required to operate the machine than are required with car dumpers of usual construction, particularly for the handling and shifting of the cars preparatory to and after being received in the dumper cradle. Additionally, as already referred to, there is a great saving of space, particularly on the bulk head or in shore end of the pier, since the long approaches and take-offs required with the ordinary car dumpers are eliminated, leaving very much more available space for yard storage tracks.

While I have described only the preferred construction, many changes can be made in the arrangement and construction of the parts without departing from the principal features of the invention, and possibly certain parts or elements could be eliminated without very materially affecting the utility of other parts.

Having described my invention, I claim—

1. A car dumping apparatus comprising a traveling structure having an elevated cradle adapted to receive and to turn loaded cars to dump the contents therefrom, in combination with a car elevating mechanism comprising a movable platform adapted to receive a loaded car from a track and to elevate the same to a point such that it may be moved from the platform onto the dumping cradle.

2. A car dumping apparatus comprising a structure having a cradle adapted to receive and to turn loaded cars to dump the contents therefrom, in combination with an elevator having a movable platform for lifting loaded cars up to substantially the level of the cradle, and a lowerator having a movable platform for lowering the empty cars.

3. In a material handling apparatus, a car dumper having a cradle adapted to receive loaded cars and for turning the same to dump the contents thereof, in combination with means for bringing loaded cars onto the cradle of the dumper, and a device for transferring the empty cars from the cradle to a receiving track beneath, comprising a platform on which the empty cars are adapted to be placed, and movable up and down between the cradle and the track.

4. A multiple unit car handling apparatus consisting of a car dumper, an elevator and a lowerator, the dumper having a cradle for receiving and turning loaded cars, the elevator having means for lifting the loaded cars to substantially the level of the dumper cradle, and the lowerator having means for lowering the empty cars from substantially the level of the cradle to a receiving track beneath.

5. A multiple unit material handling apparatus including three wheeled structures, and comprising a car dumper having a cradle for receiving and turning the loaded cars to dump the contents therefrom, an elevator having a platform movable upwardly and downwardly in its structure for elevating loaded cars to substantially the level of the cradle, and a lowerator having a platform for receiving the empty cars, and movable up and down in its structure to lower the empty cars to a receiving track beneath the machine.

6. In a multiple unit material handling apparatus, a dumping unit comprising a structure with an elevated cradle adapted to receive loaded cars and to be turned to dump the contents therefrom, an elevating unit at one end of the dumping unit and comprising a structure having a platform movable up and down in the structure and adapted to elevate loaded cars to substantially the level of the dumper cradle, means carried by the elevating unit for transferring cars from the platform to the cradle of the dumping unit, and a lowering unit at the opposite end of the dumping unit, and comprising a structure with a platform movable up and down therein and adapted to receive the empty cars from the dumping unit and to lower the same to a receiving track beneath.

7. In a multiple unit material handling apparatus, a dumping unit comprising a structure with an elevated cradle adapted to receive loaded cars and to be turned to dump the contents therefrom, an elevating unit at one end of the dumping unit and comprising a structure having a platform movable up and down in the structure and adapted to elevate loaded cars to substantially the level of the dumper cradle, and a lowering unit at the opposite end of the dumping unit, and comprising a structure with a platform movable up and down therein and adapted to receive the empty cars from the dumping unit and to lower the same to a receiving track beneath, said units being mounted for movement along a runway.

8. In a multiple unit material handling apparatus, a dumping unit comprising a structure with an elevated cradle adapted to receive loaded cars and to be turned to dump the contents therefrom, an elevating unit at one end of the dumping unit and comprising a structure having a platform movable up and down in the structure and adapted to elevate loaded cars to substantially the level of the dumper cradle, and a lowering unit at the opposite end of the dumping unit, and comprising a structure with a platform movable up and down therein and adapted to receive the empty cars from the dumping unit and to lower the same to a receiving track beneath, said units being coupled together, and being provided with wheeled trucks by which they may be moved simultaneously along a runway.

9. A boat loading apparatus comprising a traveling supporting structure with receptacles on opposite sides thereof, each having a conveying and distributing mechanism by which material may be discharged into a boat, and a rolling cradle positioned between the receptacles and adapted to receive a loaded car and to be rolled in either direction to dump the contents therefrom into the receptacles.

10. In a material handling apparatus, a car dumper comprising a structure having a cradle adapted to receive loaded cars and to be turned in either direction so as to dump the contents therefrom at either side of the structure, in combination with an elevator having a movable platform for lifting loaded cars one at a time from a track up to substantially the level of the cradle, and devices for transferring loaded cars onto the platform of the elevator, and from the platform of the elevator onto the cradle of the dumper.

11. In a material handling apparatus, a car dumper comprising a structure having a cradle adapted to receive loaded cars and to be rolled so as to dump the contents therefrom, in combination with an elevator having a platform for lifting the loaded cars one at a time from a track up to substantially the level of the cradle, devices for transferring loaded cars onto the platform of the elevator, and from the platform of the elevator onto the cradle of the dumper, and a lowering device having a platform for receiving the empty cars and for lowering them to a discharge track beneath.

12. In a material handling apparatus, a car dumper comprising a supporting structure having material receiving means at opposite sides thereof, and a rolling cradle adapted to be rolled in either direction from mid position, an elevating device for loaded cars at one end of the dumper, and a lowering device for empty cars at the opposite end of the dumper.

13. In a material handling apparatus, a car dumper comprising a supporting structure having material receiving means at opposite sides thereof, a rolling cradle adapted to be rolled in either direction from central position, an elevating device for loaded cars at one end of the dumper, and a lowering device for empty cars at the opposite end of the dumper, each of said devices comprising a guideway and a platform movable up and down along the guideway.

14. In a material handling apparatus, a car dumper comprising a supporting structure having material receiving means at opposite sides thereof, a rolling cradle adapted to be rolled in either direction from central position, an elevating device for loaded cars at one end of the dumper, and a lowering device for empty cars at the opposite end of the dumper, each of said devices comprising a guideway and a platform movable up and down along the guideway, the guideway for said elevating and lowering devices being relatively inclined so that the empty cars may be lowered to a track laterally displaced from that from which the loaded cars are elevated.

15. In a material handling apparatus, a car dumper comprising a supporting structure having material receiving means at opposite sides thereof, and a rolling cradle adapted to be rolled in either direction from car receiving position, an elevating device for loaded cars at one end of the dumper, and a lowering device for empty cars at the opposite end of the dumper, the dumper and the elevating and lowering devices being in the form of separate units.

16. In a material handling apparatus, a car dumper comprising a supporting structure having material receiving means at opposite sides thereof, a rolling cradle adapted to be rolled in either direction from car receiving position, an elevating device for loaded cars at one end of the dumper, and a lowering device for empty cars at the opposite end of the dumper, the dumper and the elevating and lowering devices being in the form of separate units with connecting tracks by which cars may be transferred from the elevating device to the cradle of the dumper, and from the latter to the lowering device.

17. In a material handling apparatus, a car dumper comprising a supporting structure having material receiving means at opposite sides thereof, a rolling cradle adapted to be rolled in either direction from car receiving position, an elevating device for loaded cars at one end of the dumper, and a lowering device for empty cars at the opposite end of the dumper, the dumper and the elevating and lowering devices being in the form of units connected together and provided with wheeled trucks adapted to move along a runway.

18. The combination with a traveling structure having an elevated car dumping cradle, of a second traveling structure having car elevating means thereon, and means whereby cars may be transferred from said elevating means to said cradle.

19. The combination with a traveling structure having an elevated car dumping cradle, of a second traveling structure having car elevating means thereon, a third traveling structure having car lowering means thereon, and means whereby cars may be transferred from the elevating means to the cradle and from the cradle to the lowering means.

20. In a material handling apparatus, a plurality of traveling structures mounted upon a trackway, one of said structures having an elevated car dumping cradle, the other of said structures having car elevating means thereon, and means whereby cars may be transferred from said elevating means to said cradle.

21. In a material handling apparatus, three traveling structures mounted upon a trackway, the intermediate structure having an elevated car dumping cradle thereon, one of the end structures having car elevating means thereon, the other of the end structures having car lowering means thereon and means whereby cars may be transferred from said elevating means to the cradle and from the cradle to the lowering means.

In testimony whereof, I hereunto affix my signature.

ARTHUR F. CASE.